United States Patent
Gordon et al.

(10) Patent No.: US 6,353,696 B1
(45) Date of Patent: Mar. 5, 2002

(54) PANEL FOR MANAGING JUMPER STORAGE

(75) Inventors: Carrie Lynn Gordon, Saginaw; Jennifer D. Noble, Fort Worth, both of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/272,949

(22) Filed: Mar. 19, 1999

(51) Int. Cl.[7] .................................................. G02B 6/00
(52) U.S. Cl. ....................................................... 385/135
(58) Field of Search ................................. 385/134–137; 242/170, 171; 361/826; 211/85.5; 206/702, 393, 394

(56) References Cited

U.S. PATENT DOCUMENTS

| | | |
|---|---|---|
| 4,702,551 A | 10/1987 | Coulombe |
| 4,886,336 A | 12/1989 | Deusser et al. |
| 4,974,789 A * | 12/1990 | Milburn ........................ 242/159 |
| 5,071,211 A * | 12/1991 | Debortoli et al. .............. 385/76 |
| 5,241,617 A * | 8/1993 | Peacock et al. .............. 385/135 |
| 5,497,880 A * | 3/1996 | Dieffenbach ................. 206/395 |
| 5,640,482 A | 6/1997 | Barry et al. .................. 385/135 |
| 5,659,655 A * | 8/1997 | Pilatos ......................... 385/136 |
| 5,758,002 A | 5/1998 | Walters ........................ 385/134 |
| 5,778,130 A | 7/1998 | Walters et al. .............. 385/134 |
| 5,825,962 A | 10/1998 | Walters et al. .............. 385/315 |
| 5,933,563 A * | 8/1999 | Schaffer et al. ............. 385/135 |

FOREIGN PATENT DOCUMENTS

| | | | |
|---|---|---|---|
| JP | 10-253836 | * 9/1998 | |
| WO | WO89/08276 | 9/1989 | ............ G02B/6/40 |

* cited by examiner

*Primary Examiner*—Rodney Bovernick
*Assistant Examiner*—Michael J. Stahl

(57) ABSTRACT

A panel for managing the storage of fiber optic cable jumpers is disclosed. The panel fits within a conventional storage rack. The panel has a box-like frame with a cavity on its back side. The panel also has a front storage hub and a rear storage hub. The rear hub extends out of the cavity and is coaxial with the front hub. A port is located in the frame adjacent to the hubs. An excess length of a fiber optic cable jumper may be stored by coiling it on either or both of the hubs, depending upon the need and the length of the jumper. The jumper may be inserted through the port in either direction and joined to a fiber optic cable on each end.

20 Claims, 4 Drawing Sheets

PANEL FOR MANAGING JUMPER STORAGE

1. Technical Field

This invention relates in general to fiber optic cable management and in particular to a panel for managing the storage of excess lengths of fiber optic cable jumpers.

2. Background Art

Fiber optic cables are used for transmitting voice, data, and video communications. In some installations, a large number of fiber optic cables must be interconnected with others leading throughout the user's facility. For large systems, storage racks are often used. A storage rack is a vertical rack that supports itself on the floor and holds a number of different fiber optic connector panel housings in bays spaced one on top of the other. The connector panels have a large number of apertures for various connectors/adapters for the fibers. Some of the systems also contain electronics that must be interconnected with the fiber connector panels. In some cases, massive amounts of fiber are required to be stored and routed from the front and back of the frame. Care must be taken in storage to avoid bending the fibers more than a specified radius, normally, 1.25–1.5 inches.

The excess length of fiber optic cable jumpers is typically stored in a panel by coiling the jumper around a hub on the front side of the panel. If the jumper is exceedingly long, a large coil of the cable can be formed that may exceed the capacity of the hub. The coil can be cumbersome and can potentially interfere with the job being performed by the technician. Moreover, such coils create a very cluttered appearance. Although hubs and panels in general could be made larger to accommodate such needs, they may not fit conventionally-sized mounting racks. An improved panel for managing fiber optic cable jumpers is needed.

SUMMARY OF THE INVENTION

A panel for managing the storage of fiber optic cable jumpers is disclosed. The panel fits within a conventional storage rack. The panel has a box-like frame with a cavity on its back side. The panel also has a front storage hub and a rear storage hub. The rear hub extends out of the cavity and is coaxial with the front hub. A port is located in the frame adjacent to the hubs. An excess length of a fiber optic cable jumper may be stored by coiling it on either or both of the hubs, depending upon the need and the length of the jumper. The jumper may be inserted through the port in either direction and joined to a fiber optic cable on each end.

BEST MODE OF CARRYING OUT THE INVENTION

Figure 1:
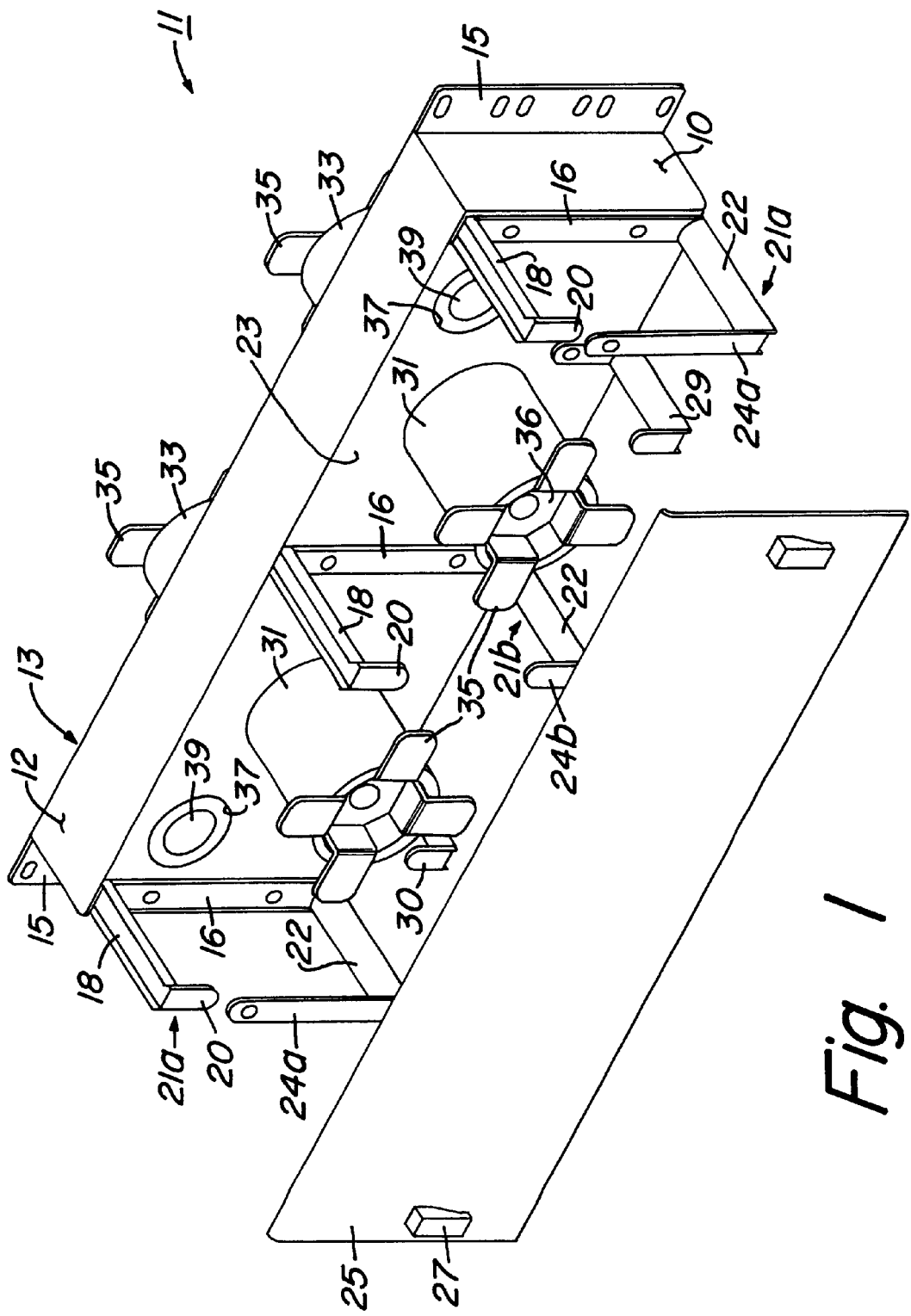
FIG. 1 is a partially exploded, front isometric view of a jumper management panel constructed in accordance with the invention.
Figure 2:
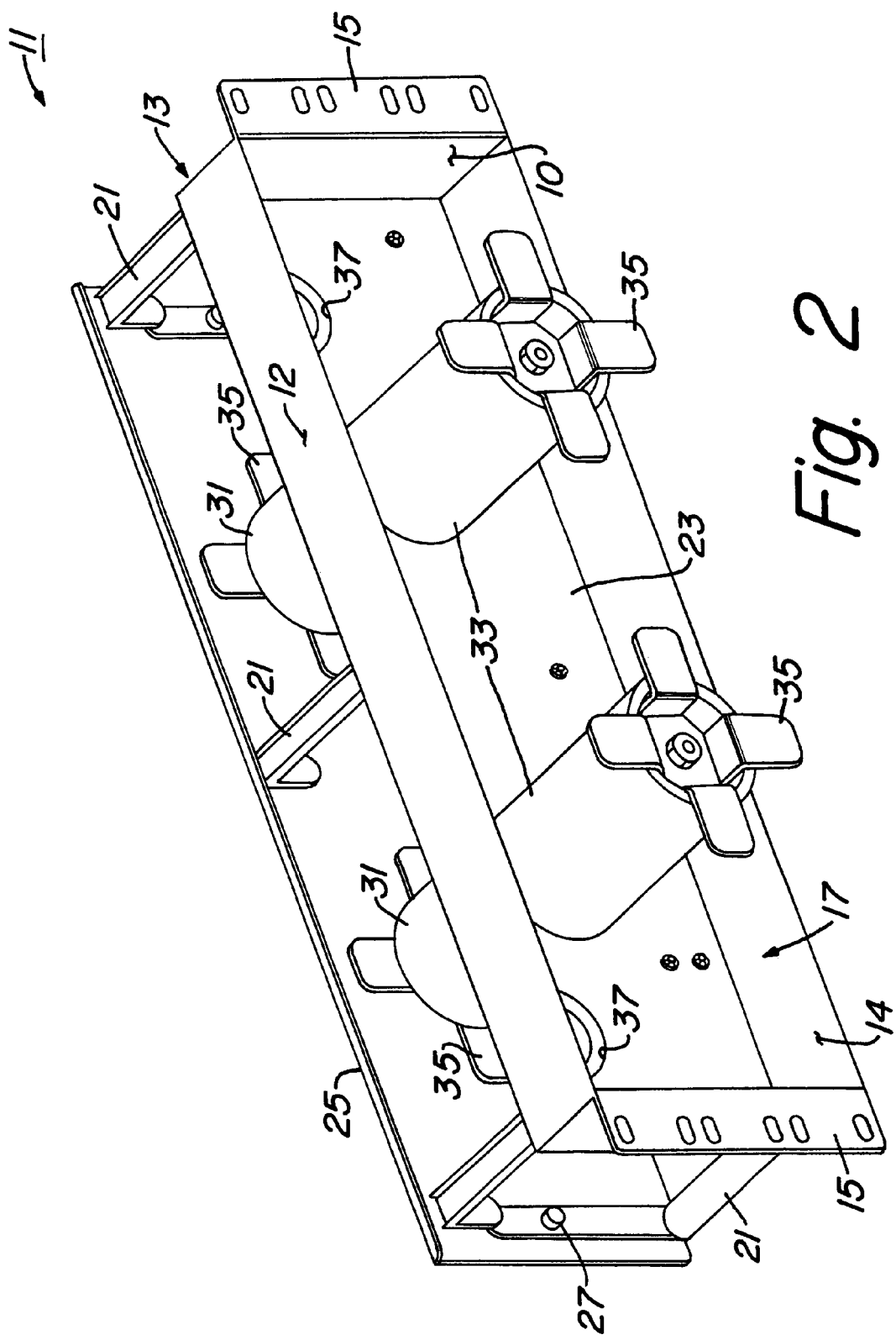
FIG. 2 is a rear isometric view of the panel of FIG. 1.

Referring to FIG. 1, a panel 11 for managing the storage of fiber optic cable jumpers is shown. Panel 11 comprises an elongated rectangular box-like frame 13 having a mounting flange 15 on each side or lateral end for securing panel 11 to a storage rack 19 (see FIG. 3). The open rear side of frame 13 (FIG. 2) defines a rectangular cavity 17 having a base wall 23 positioned parallel to and forward from flanges 15. Frame 13 has upper and lower walls 12,14 and side walls 10 that define cavity 17. Each wall 10,12,14 is perpendicular to base wall 23. A set of three standoff brackets 21a,21b are secured to the front surface of base wall 23 and extend forward therefrom. Brackets 21a are located adjacent to each lateral side of frame 13, and the third bracket 21b is centered between them on the front surface of base wall 23.

Each of the brackets 21a,21b are generally square in shape with integrally formed members, including a vertical rearward brace 16, a horizontal top brace 18, a downward protruding flange 20 on the forward end of top brace 18, a horizontal bottom brace 22, and an upward protruding flange 24. Bottom braces 22 are longer than top braces 18 so that flanges 20 are parallel to and located rearward of flanges 24. The flanges 24a on the side brackets 21a are much longer than flange 24b on the center bracket 21b. Consequently, flanges 24a on the side brackets 21a slightly overlap their respective flanges 20, whereas flange 24b on the center bracket 21b is spaced apart from its flange 20, as shown. Brackets 21 are mounted to base wall 23 along their rearward braces 16.

A rectangular cover plate 25 detachably mounts to the flanges 24a of brackets 21a with a fastener 27 on each side of the plate 25. Cover plate 25 is parallel to and spaced forward from base wall 23 and has approximately the same surface area as base wall 23. Frame 13 also has a pair of wire rungs 29 that extend forward from the front surface of base wall 23. Wire rungs 29 are elongated arms with an upward protruding lip or flange 30 on their forward ends. Each wire rung 29 is located between two adjacent brackets 21 for redirecting and/or managing fiber optic cable. Wire rungs 29 are slightly shorter in length than brackets 21 (FIG. 4) so that they do not make contact with cover plate 25 when it is installed.

Figure 4:
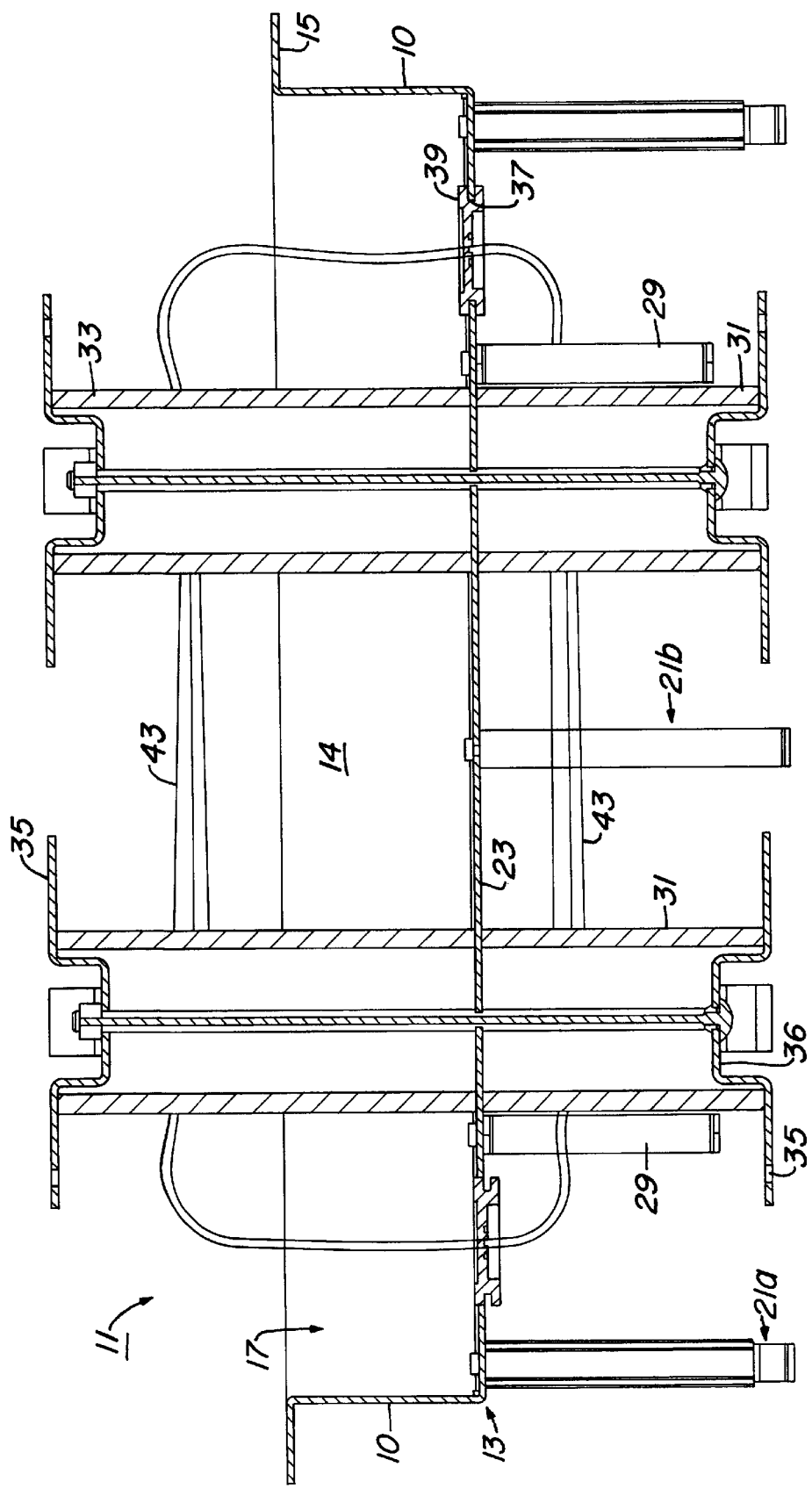
FIG. 4 is a sectional top view of the management panel of FIG. 1 taken along the line 4—4 of FIG. 3.

Panel 11 is provided with two front storage hubs 31 and two rear storage hubs 33 that are mounted to base wall 23. In the preferred embodiment, hubs 31,33 are cylindrical in shape and perpendicular to base wall 23. Alternatively, hubs 31,33 could have other shapes as long as the minimum radius cannot be violated, including oval or be formed from two partially cylindrical segments that are spaced apart from one another. In the preferred embodiment, front hubs 31 are symmetrically spaced apart from one another about the center bracket 21b, but could have any spacing relative to one another. Rear hubs 33 extend in a rearward direction from the backside of base wall 23 in cavity 17. In the embodiment shown, each rear hub 33 is coaxial with one front hub 31. As shown in FIG. 4, each set of paired hubs 31,33 are separate elements, but paired hubs 31,33 may be formed from a single cylinder that extends through base wall 23. Hubs 33 are preferably longer than hubs 31 and extend from the rearward surface of cavity 17. The ends 36 of each hub 31,33 have integral retention flanges 35 for retaining coiled fiber optic cable on hubs. Alternatively, a different number of flanges or a single flat plate, which is larger than the hubs 31,33, could be used to hold the jumpers on the hubs. A port 37 is provided in base wall 23 adjacent to each set of paired hubs 31,33 for the passage of fiber optic cable. Ports 37 provide access to the front and rear of frame 13. Each port 37 contains a rubber grommet 39 that may be used to seal it and protect the fiber optic cables from the sharp edges of the panel.

Figure 3:
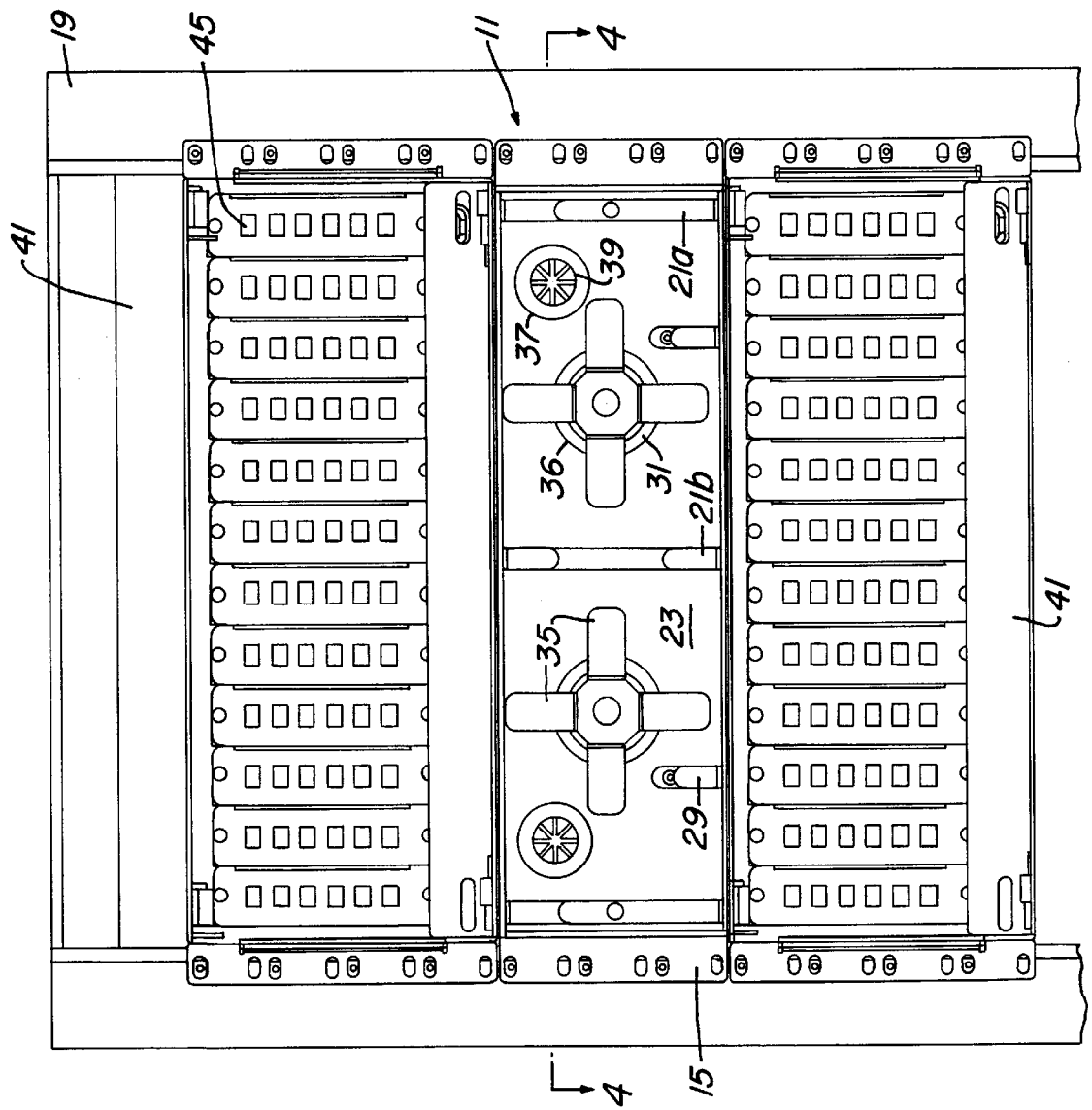
FIG. 3 is a front view of the panel mounted between two patch panels in a rack.

In operation, panel 11 is typically mounted in a rack 19 by securing flanges 15 to the rack. Typically, panel 11 will be located between a pair of connector housings 41 (FIG. 3) on the rack 19. Each connector housing 41 is conventional, having a plurality of apertures 45 for connecting fiber optic cables. In FIG. 3, panel 11 is shown without cover plate 25 that would normally be mounted to it. As shown in FIG. 4, the excess length of a fiber optic cable jumper 43 (two jumpers shown) may be stored by coiling it on either or both of hubs 31,33, depending upon the need and length of the jumpers. Jumpers 43 may be inserted through ports 37 in either direction and joined to a fiber optic cable (not shown) on each end in a conventional manner. Cover plate 25 is secured after a cabling procedure is completed, but can be readily removed for additional procedures.

The invention has several advantages. The dual storage hubs on each side of the panel better facilitate the management of excess lengths of fiber optic cables and jumpers. The rear hubs allow excess cable to be stored out of sight to create a more aesthetic appearance while reducing clutter for technicians. The rear hubs also provide additional storage capacity while maintaining a slim profile for the panel.

While the invention has been shown or described in only some of its forms, it should be apparent to those skilled in the art that it is not so limited, but is susceptible to various changes without departing from the scope of the invention.

We claim:

1. A panel for managing the storage of a cable, comprising:
    a frame having a front side, a rear side, and a port for providing access therebetween;
    a front hub mounted to and extending forward from the front side of the frame;
    a rear hub mounted to and extending rearward from the rear side of the frame;
    at least one standoff bracket secured to the front side of the frame; and
    a cover mounted to the standoff bracket for covering the front side of the frame and the front hub;
    wherein the hubs are adapted to receive and store coils of the cable on either or both sides of the frame by extending the cable through the port to the desired hub.

2. The panel of claim 1 wherein the front hub comprises a pair of hubs and the rear hub comprises a pair of hubs.

3. The panel of claim 1 wherein the hubs are coaxial with one another.

4. The panel of claim 1 wherein the hubs are perpendicular to the frame.

5. The panel of claim 1, further comprising a grommet for sealing the port.

6. The panel of claim 1, further comprising a retention flange on each of the hubs adapted to retain the coiled cable on the hubs.

7. The panel of claim 1 wherein the frame has a vertical base wall to which the hubs are mounted, upper and lower horizontal walls, and vertical lateral walls that are perpendicular to the base wall and the horizontal walls, the lateral and horizontal walls extending rearward from the base wall.

8. The panel of claim 1 wherein the frame is a rectangular box having a cavity on the rear side and the rear hub protrudes from the cavity.

9. The panel of claim 1, further comprising a wire rung mounted to the frame for managing the cable.

10. A panel for managing the storage of a cable, comprising:
    a base wall having a front side, a rear side, a port for providing access therebetween, and a cavity on the rear side;
    a pair of front hubs mounted to and extending forward from the front side of the base wall;
    a pair of rear hubs mounted to and extending rearward from the cavity on the rear side of the base wall;
    at least one standoff bracket secured to the front side of the base wall; and
    a cover mounted to the standoff bracket for covering the front side of the base wall and the front hub;
    wherein the hubs are adapted to receive and store coils of the cable on either or both sides of the base wall by extending the cable through the port to the desired hub.

11. The panel of claim 10 wherein each of the front hubs is coaxial with one of the rear hubs.

12. The panel of claim 10, further comprising a grommet for sealing the port.

13. The panel of claim 10 wherein the port comprises a pair of holes in the base wall, each of the holes being adjacent to at least one of the front and rear hubs.

14. The panel of claim 10, further comprising a retention flange on each of the hubs which is adapted to retain the coiled cable on the hubs.

15. The panel of claim 10 wherein the base wall is vertically oriented and has upper and lower horizontal walls, and vertical lateral walls that are perpendicular to the base wall and the horizontal walls, the lateral and horizontal walls extending rearward from the base wall to define the cavity.

16. The panel of claim 10, further comprising a wire rung mounted to the base wall for managing the cable.

17. A method for managing the storage of a cable, comprising:
    (a) providing a panel with a frame having a front side, a rear side, and a port for providing access therebetween and securing at least one standoff bracket to the front side of the frame;
    (b) mounting a front hub to the front side of the frame and a rear hub to the rear side of the frame;
    (c) receiving and storing coils of the cable on the hubs on either or both sides of the frame by extending the cable through the port to the desired hub; and
    (d) covering the front side of the frame and the front hub by mounting a cover to the standoff bracket.

18. The method of claim 17, further comprising the step of sealing the port with a grommet.

19. The method of claim 17, further comprising the step of retaining the coiled cable on the hubs with a retention flange on each of the hubs.

20. The method of claim 17 wherein step (a) further comprises extending the rear hub from a cavity in the rear side of the frame.

* * * * *